Aug. 30, 1960  E. S. VAN VOLKENBURGH  2,950,939
FISH GRIPPER
Filed Feb. 11, 1957
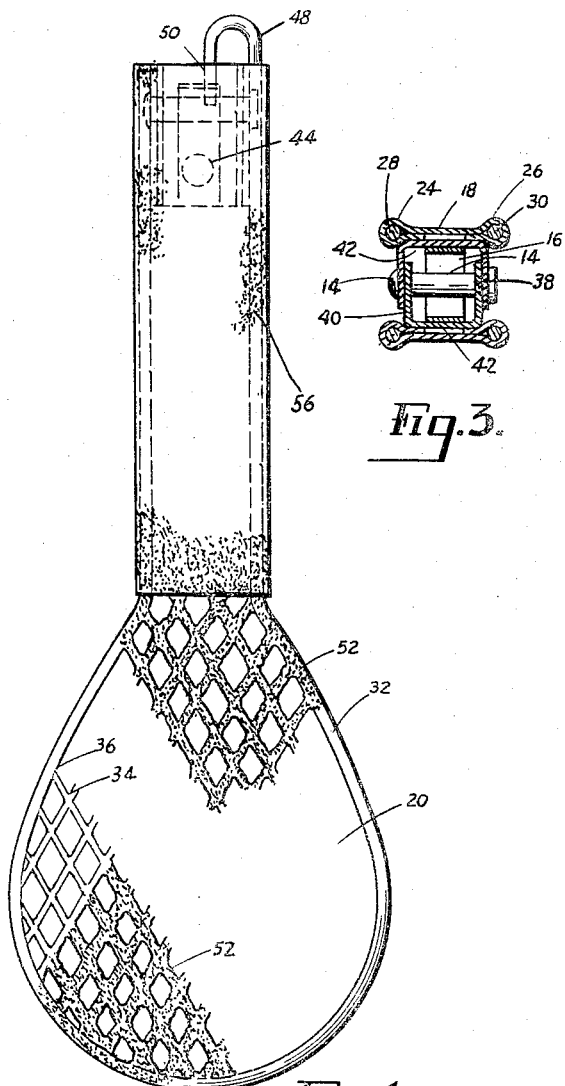
Fig. 1.
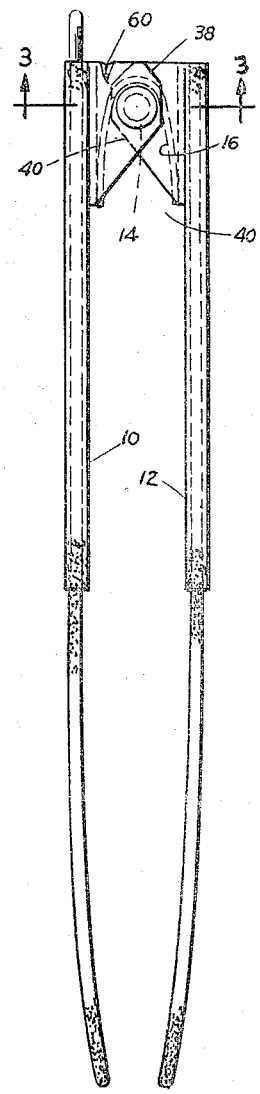
Fig. 2.
Fig. 3.
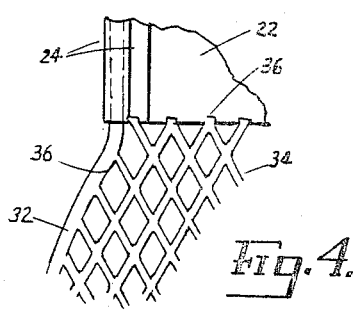
Fig. 4.
INVENTOR.
EDNA S VAN VOLKENBURGH
BY
ATTORNEY United States Patent Office 2,950,939
Patented Aug. 30, 1960

2,950,939
FISH GRIPPER
Edna S. Van Volkenburgh, Wetzel Road, R.D. 1, Liverpool, N.Y.
Filed Feb. 11, 1957, Ser. No. 639,543
1 Claim. (Cl. 294—16)

This invention relates to a fish gripper, and more particularly to a manually actuated gripper having a surface structure effective when in contact with fish scales, to securely hold a fish.

When a fish is first caught on a barbed hook and drawn from the water, it is desirable to promptly remove the hook with as much dispatch as possible. The freshly caught fish is exceedingly lively and difficult to hold. Its slippery scales tend to slip from the hand during the reflex activity of the fish, which activity may become quite vigorous upon attempt to manipulate the hook to free the same. While it is difficult to hold a fish during the operation, there is also the factor that many find the feel of the slippery scales distasteful, and fail to apply a sufficiently powerful grip, essential to holding the fish while extracting the hook, and essential to prevent the fish from getting away, when the hook is removed. It will be appreciated that when a fish is securely gripped, the operation of removing the hook is made more easy, and less likely to injure the fish should it be necessary to return the fish, due to an off-season catch, or size regulations.

The present invention is directed to a gripper, adapted to be held in the hand by a fisherman, and which is provided with fish body scale engaging surfaces, the very nature of which assures a positive grip with a minimum of pressure, by which the most obstreperous fish may be held sufficiently still to facilitate easy hook removal, and thereafter held securely until such disposition of the fish is made as is desired. Further, the invention contemplates a gripper which is readily placed in gripping relation upon a fish, despite reflex activity, as well as a gripper which requires little muscular effort to apply secure holding pressure.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claim.

In the drawings, wherein like reference characters indicate like parts:
Figure 1 is a plan view of the gripper;
Figure 2 is a side view of the gripper, in partly closed position;
Figure 3 is a sectional view taken substantially in the line 3—3 of Figure 2; and
Figure 4 is an enlarged fragmentary detail of one arm, showing the supporting structure.

Referring to the drawings, there is shown a pair of manually operable jaw members, of similar construction, generally indicated at 10 and 12, which members are pivoted together as at 14. A flat V spring 16 retains the jaws in open position, in readiness for manual closing upon the body of a fish.

Each of the jaws comprises a handle portion 18, merging into an oval or pear shape slightly concave gripping pad portion 20. The handle portion may be formed of a sheet metal member 22 having its side edges 24, 26 rolled over the straight parallel ends 28 and 30 of a wire loop 32, which latter defines the pad portion. The pad portion is formed by securing a section of expanded metal 34 within the loop, the free ends of the section in contact with the loop and the end of the member being soldered or otherwise rigidly secured as at 36.

Each of the jaws is provided at its pivotal end, with a channel member as at 38 and 40. The side flanges of the channel members overlap one another, and are provided with a pivot pin 14. Such channel members may have their web portions 42 soldered or otherwise secured to the sheet metal members 18 forming the handle, in the manner shown. To facilitate the application of solder the members 18 may be provided with an aperture 44.

To avoid loss of the gripper, one of the straight wire ends may project beyond the end of the handle as at 48, and be looped, and have its end 50 soldered to the central portion of the handle member 18, in order to provide a means for attaching a heavy cord, by which the gripper may be retrieved should it slip from one's grasp.

The expanded metal and loop portion of the wire frame of each of the gripper pads are dipped in a suitable primer, then in sand while the primer is tacky, after which the pad is dipped in lacquer, followed by additional applications of sand, and a final dipping in lacquer. The resultant surface is relatively difficult to illustrate and difficult to describe. The apertures 52 of the expanded metal are reduced in size by about a half, by the build-up thus resulting, while the build-up of sand covered by lacquer on the wire frame increases the apparent diameter of the wire by about double. The facing surfaces of the pads provide a rough but effective surface for the gripping of a fish. If desired, the back faces may be rendered more smooth, by knocking off projecting sand particles before applying the last coating of lacquer.

The handle parts may be dipped in primer and thereafter the exterior faces treated with fine sawdust, indicated at 56, while still tacky, after which there may be applied a coat of lacquer. By such procedure, a good gripping surface having excellent "feel" is provided.

Any form of stop such as the edge 60 of the side flange of channel 40 may be provided to limit the open position of the jaws, the edge 60 engaging the web 42 of the channel 38, to limit the open movement. The spring serves to urge the jaws normally to open position. It will be seen that when held with the handles in the grasp of the hand, the pads may be quickly closed upon the body of a fish, and thereafter the fish may be securely held, until it is desired to effect a release by opening the jaws.

It will be seen that a lightweight effective gripper has been provided, with a gripping surface that is effective and rugged and yet economically constructed. By the use of vairous lacquer colors, the gripper becomes both attractive, while the metal parts thereof are protected from rust.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claim for a definition of the limits of the invention.

What is claimed is:

A fish gripper comprising a pair of manually actuatable gripper members, each of substantially like construction, each of said members comprising an elongated rectangular sheet metal handle portion, the lengthwise edges of which are rolled to form tubular sockets, and a wire loop defining a jaw portion having parallel spaced extensions extending into and secured within said tubular sockets, said loop portion having an expanded metal gripping pad portion of a configuration corresponding to the area defined by said loop and the adjacent end of the handle, said expanded metal being secured to said loop and said handle end, and said loop and said expanded metal being coated with granules of sand and a lacquer binder, and said granules of sand and binder having a lacquer coating, and means to pivot said gripper members together at their ends opposite from said jaw portion ends, and resilient means disposed around said pivot to normally urge said jaws apart.

References Cited in the file of this patent

UNITED STATES PATENTS

| | | |
|---|---|---|
| 269,971 | Swett | Jan. 2, 1883 |
| 1,188,185 | Krulish | June 20, 1916 |
| 1,566,394 | Gilder | Dec. 22, 1925 |
| 2,201,196 | Williamson | May 21, 1940 |
| 2,263,965 | Fiori | Nov. 25, 1941 |
| 2,315,444 | Meade | Mar. 30, 1943 |
| 2,677,502 | Denker et al. | May 4, 1954 |
| 2,757,951 | Benton | Aug. 7, 1956 |
| 2,785,862 | Lansing | Mar. 19, 1957 |
| 2,801,877 | Hetrick | Aug. 6, 1957 |